(12) United States Patent
Albert et al.

(10) Patent No.: US 11,695,311 B2
(45) Date of Patent: Jul. 4, 2023

(54) INTERFERENCE SUPPRESSION MODULE FOR AN ELECTRICALLY COMMUTATED ELECTRIC MOTOR, METHOD FOR PRODUCING AN INTERFERENCE SUPPRESSION MODULE, AND VEHICLE COMPRISING SUCH AN INTERFERENCE SUPPRESSION MODULE

(71) Applicant: CONTI TEMIC MICROELECTRONIC GMBH, Nuremberg (DE)

(72) Inventors: Andreas Albert, Hoechstadt/Aisch (DE); Juergen Henniger, Erlangen-Dechsendorf (DE); Matthias Keuten, Schwarzenbruck-Ot Altenthann (DE)

(73) Assignee: Vitesco Tehcnologies Germany GmbH, Hannover (DE)

( * ) Notice: Subject to any disclaimer, the term of this patent is extended or adjusted under 35 U.S.C. 154(b) by 859 days.

(21) Appl. No.: 15/767,705

(22) PCT Filed: Sep. 19, 2016

(86) PCT No.: PCT/EP2016/072196
§ 371 (c)(1),
(2) Date: Apr. 12, 2018

(87) PCT Pub. No.: WO2017/063820
PCT Pub. Date: Apr. 20, 2017

(65) Prior Publication Data
US 2018/0309346 A1    Oct. 25, 2018

(30) Foreign Application Priority Data

Oct. 14, 2015 (DE) .......................... 102015219979.7

(51) Int. Cl.
*H02K 11/02* (2016.01)
*H01R 12/72* (2011.01)
(Continued)

(52) U.S. Cl.
CPC ........... *H02K 11/02* (2013.01); *H01R 12/724* (2013.01); *H02K 5/225* (2013.01); *H02K 11/30* (2016.01)

(58) Field of Classification Search
USPC .................................................. 310/68 R, 72
See application file for complete search history.

(56) References Cited

U.S. PATENT DOCUMENTS 6,650,559 B1 * 11/2003 Okamoto ............ H01L 23/3672
257/E23.103
6,784,527 B2    8/2004 Fukunaga
(Continued)

FOREIGN PATENT DOCUMENTS

| CN | 101242148 A | 8/2008 |
| CN | 201374635 Y | 12/2009 |

(Continued)

OTHER PUBLICATIONS

Machine translation of DE 102008043774 A1 retrieved from ESPACENET (Year: 2010).*

(Continued)

*Primary Examiner* — Ahmed Elnakib
*Assistant Examiner* — Minki Chang
(74) *Attorney, Agent, or Firm* — Laurence A. Greenberg; Werner H. Sterner; Ralph E. Locher

(57) ABSTRACT

An interference suppression module for an electrically commutated electric motor has the following components: a circuit carrier, an electronic circuit arrangement, which is arranged on the circuit carrier, an encapsulation, which surrounds the electronic circuit arrangement in a form-fitting (Continued)

and material-bonding manner, and at least one interface, which is provided for the purpose of electrical contact-connection of the electronic circuit arrangement to a control unit of the electrically commutated electric motor. The specification details an interference suppression module, a method for producing an interference suppression module, and a vehicle equipped with an interference suppression module.

11 Claims, 3 Drawing Sheets

(51) Int. Cl.
*H02K 11/30* (2016.01)
*H02K 5/22* (2006.01)

(56) References Cited

U.S. PATENT DOCUMENTS

| | | |
|---|---|---|
| 7,417,873 B2 | 8/2008 | Kadoya et al. |
| 8,674,636 B2 | 3/2014 | Matsuo et al. |
| 9,159,506 B2 | 10/2015 | Matsuo et al. |
| 9,564,789 B2 | 2/2017 | Wallrafen |
| 9,609,789 B2 | 3/2017 | Tokuyama et al. |
| 2004/0027014 A1 | 2/2004 | Weigold et al. |
| 2015/0288245 A1 | 10/2015 | Maerkle et al. |
| 2016/0211727 A1* | 7/2016 | Maier ............... H02K 11/33 |

FOREIGN PATENT DOCUMENTS

| | | | | |
|---|---|---|---|---|
| CN | 202034863 U | | 11/2011 | |
| CN | 103872935 A | | 6/2014 | |
| CN | 204145193 U | | 2/2015 | |
| DE | 10119404 A1 | | 10/2002 | |
| DE | 102008043774 A1 | * | 5/2010 | ........... H05K 1/0209 |
| DE | 102008043774 A1 | | 5/2010 | |
| DE | 102011013449 B4 | | 12/2013 | |
| DE | 102012218847 A1 | | 4/2014 | |
| EP | 1677583 A1 | | 7/2006 | |
| JP | H03159186 A | | 7/1991 | |
| JP | 10066290 A | * | 3/1998 | |
| JP | 2002204580 A | | 7/2002 | |
| JP | 2003108967 A | | 4/2003 | |
| JP | 2008187798 A | | 8/2008 | |
| JP | 2009130230 A | | 6/2009 | |
| JP | 2010110065 A | | 5/2010 | |
| JP | 2012161242 A | | 8/2012 | |
| JP | 2013243902 A | | 12/2013 | |
| JP | 2013243902 A | * | 12/2013 | |

OTHER PUBLICATIONS

Machine translation of JP 2013243902 A retrived from ESPACENET (Year: 2013).*

Machine translation of JP-10066290-A, Mar. 6, 1998, Ogawa Yoshiaki, retrieved from ESPACENET.*

* cited by examiner

INTERFERENCE SUPPRESSION MODULE FOR AN ELECTRICALLY COMMUTATED ELECTRIC MOTOR, METHOD FOR PRODUCING AN INTERFERENCE SUPPRESSION MODULE, AND VEHICLE COMPRISING SUCH AN INTERFERENCE SUPPRESSION MODULE

BACKGROUND OF THE INVENTION

Field of the Invention

The invention relates to an interference suppression module for an electrically commutated electric motor. The invention further relates to a method for producing such an interference suppression module and to a vehicle comprising such an interference suppression module.

Electrically commutated electric motors are sufficiently well known and are distinguished by a reduced number of wearing parts compared to brush-commutated electric motors. Such electric motors are used, for example, in vehicle transmissions, which in combination with one another form a geared motor.

Such an electric motor is actuated, for example, by means of a power electronics system operated by pulse-width modulation, said power electronics system being integrated in a control device, for example a transmission control device. A circuit of the power electronics system in this case comprises three voltage dividers, which subdivide an input voltage, for example a supply voltage of 12 V of a vehicle on-board power supply system, into three phase voltages each temporally offset from one another by, for example, 120°. This means that the electric motor is operated using a three-phase alternating current.

Since the phase voltages may have undesirable voltage peaks on account of the pulse-width modulation, interference suppression is required to smooth the phase voltages. For example, ceramic capacitors or electrolytic capacitors are used as interference suppression components; however, these have a low degree of thermal stability.

SUMMARY OF THE INVENTION

The invention is therefore based on the object of providing an interference suppression module for an electrically commutated electric motor that is improved compared to the prior art. The invention is furthermore based on the object of providing a suitable method for producing such an interference suppression module and a vehicle having such an interference suppression module that is improved compared to the prior art.

Advantageous configurations of the invention are the subject matter of the dependent claims.

With respect to the interference suppression module, the object is achieved according to the invention using the features as claimed. With respect to the method, the object is achieved using the features as claimed. With respect to the vehicle, the object is achieved according to the invention using the features as claimed.

An interference suppression module for an electrically commutated electric motor comprises a circuit carrier, an electronic circuit arrangement, which is arranged on the circuit carrier, an encapsulation, which surrounds the electronic circuit arrangement in a form-fitting and material-bonding manner, and at least one interface, which is provided for the purpose of electrical contact-connection of the electronic circuit arrangement to a control unit of the electrically commutated electric motor.

An interference suppression module separate to the control unit of the electric motor makes it possible to populate the circuit carrier with the electronic circuit arrangement, which comprises, in particular, interference suppression components, outside of an electronics space of the control unit. Since interference suppression components, for example electrolytic capacitors, usually require a very large amount of space and also have only low thermal stability, placement of the interference suppression components in a manner optimized for installation space and an increased lifetime of the electronic circuit arrangement compared to the prior art are made possible by means of the separate interference suppression module according to the invention.

Furthermore, compared to the prior art, the interference suppression module can be designed to be substantially flatter and in this case modularly scalable. In the event of repair of the interference suppression module, replacement is also easily possible. Moreover, the interference suppression module can be produced separately to the control unit and a separate housing on the control unit for protection of the interference suppression components is not required, since the electronic circuit arrangement is protected against external influences, for example transmission oil, by the encapsulation.

The interference suppression module can be coupled, for example, to a transmission control device, which actuates a geared motor of a vehicle. In this case, the control unit is the transmission control device and the electric motor, together with a transmission of the vehicle, forms the geared motor.

In accordance with one configuration of the invention, the interface for electrical contact-connection of the interference suppression module is designed as a lead frame, which is integrated into the circuit carrier.

In alternative configurations, the interface comprises an exposed contact surface, which is electrically connected to the electronic circuit arrangement by means of an electrical line element integrated into the circuit carrier. One side of the interference suppression module that faces away from the control unit expediently has no open electrical contact points, such that short circuits can be prevented.

Furthermore, in accordance with one configuration of the invention, the interface can be designed as a plug module, which has at least one electrical contact pin and a further encapsulation surrounding the contact pin in a form-fitting and material-bonding manner. In this case, the interference suppression module can be easily connected to the control unit.

The encapsulation and the further encapsulation are preferably formed in one piece. The interference suppression module can thereby be produced particularly easily with a plug module, since there is no need to form a separate housing.

The electronic circuit arrangement is preferably connected to the circuit carrier by means of a material bond. For example, the electronic circuit arrangement is adhesively bonded to the circuit carrier, for example by means of a thermally conductive adhesive. Alternatively, the electronic circuit arrangement can also be soldered or welded to the circuit carrier. It is also possible to provide bonding wires for the purpose of electrical contact-connection of the electronic circuit arrangement to the circuit carrier. Moreover, mechanical fixing, for example by means of a screw-attachment point, a socket or by means of a holding geometry, for example a holding clamp, is possible.

As the interference suppression components, the electronic circuit arrangement has at least one capacitor, for example a ceramic capacitor or an electrolytic capacitor.

A method for producing an interference suppression module for an electrically commutated electric motor is furthermore provided, wherein an electronic circuit arrangement is arranged on and fixed to at least one flat side of a circuit carrier, wherein at least one interface for the purpose of electrical contact-connection of the electronic circuit arrangement to a control device of the electrically commutated electric motor is integrated into the circuit carrier, and wherein at least the electronic circuit arrangement is provided with a curable encapsulation material, which, upon curing, is connected to the electronic circuit arrangement in a form-fitting and material-bonding manner and encapsulates said electronic circuit arrangement in one piece.

The method makes it possible to produce an interference suppression module, which can be easily coupled to a control unit for actuating the electric motor, in a simple and cost-effective manner.

Moreover, a vehicle is provided, which comprises an electrically commutated electric motor, a control unit for actuating the electric motor and an interference suppression module according to the invention, which is connected, at least electrically, to the control unit.

As a result of the fact that the lifetime of the electronic circuit arrangement is increased by means of the interference suppression module, the function of the electric motor and hence, for example, of a geared motor of the vehicle, can be maintained over the long term. The vehicle is therefore improved with respect to the lifetime and function compared to the prior art.

Exemplary embodiments of the invention are explained in more detail below with reference to drawings.

BRIEF DESCRIPTION OF THE SEVERAL VIEWS OF THE DRAWING

In the drawings.

In all of the figures, the same reference signs are used for mutually corresponding parts.

DESCRIPTION OF THE INVENTION

Figure 1:
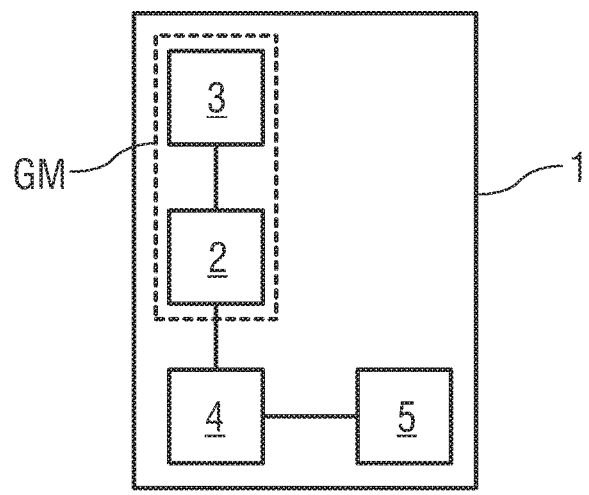
FIG. 1 schematically shows a vehicle comprising an electric motor, a control unit for actuating the electric motor and an interference suppression module according to the invention, FIG. 2 schematically shows the interference suppression module in a general embodiment, and FIGS. 3 to 6 schematically show sectional illustrations of the interference suppression module in various exemplary configurations.

FIG. 1 schematically shows a vehicle 1 in a highly simplified manner.

The vehicle 1 comprises an electrically commutated electric motor 2, which, in the present exemplary embodiment comprising a transmission 3 of the vehicle 1, forms a geared motor GM and is actuated by a control unit 4.

The transmission 3 is, for example, an automatic vehicle transmission, the gear stages of which are adjusted by means of the electric motor 2.

The electric motor 2 is electrically commutated and is therefore designed as a brushless motor. The electric motor 2 is actuated by means of the control unit 4, which for this purpose has, for example, a power electronics system operated by pulse-width modulation (not illustrated here).

As already described at the outset, the power electronics system comprises three voltage dividers, which subdivide an input voltage, for example a supply voltage of 12 V of an on-board power supply system of the vehicle 1, into three phase voltages each temporally offset from one another by, for example, 120°. This means that the electric motor 2 is operated using a three-phase alternating current.

Since the phase voltages may have undesirable voltage peaks on account of the pulse-width modulation, an interference suppression module 5 according to the invention is provided, which is required to smooth the phase voltages.

The interference suppression module 5 is electrically, and where appropriate also mechanically, connected to the control unit 4 and is produced and assembled as a separate module.

Figure 2:
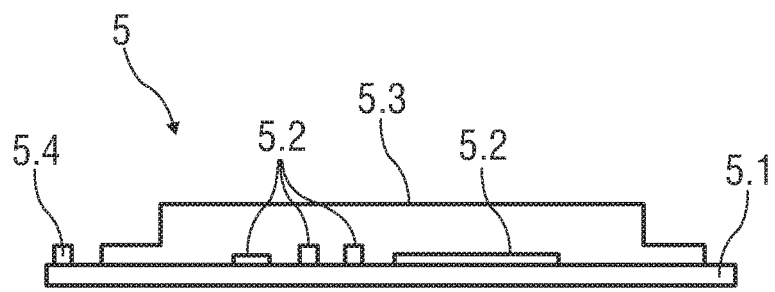

FIG. 2 shows the interference suppression module 5 in a general embodiment in a highly simplified manner.

The interference suppression module 5 comprises a circuit carrier 5.1, for example a so-called HDI printed circuit board, on which an electronic circuit arrangement 5.2 is arranged and to which it is secured in a material-bonding manner, for example by means of adhesive bonding, welding or soldering.

The electronic circuit arrangement 5.2 comprises a prescribed number of capacitors, in particular electrolytic capacitors and/or ceramic capacitors, as the interference suppression components. The interference suppression components are electrically contact-connected to the circuit carrier 5.1, for example, by means of wire bonding, soldering, welding and/or by means of using a thermally conductive adhesive.

The encapsulation 5.3 surrounds all of the components on the circuit carrier 5.1, that is to say in particular the electronic circuit arrangement 5.2, completely and in one piece, such that they are protected against external influences, such as filings, transmission oil, for example.

On account of the one-piece design of the encapsulation 5.3, the interspaces in the electronic circuit arrangement 5.2 are also closed, such that open interfaces are prevented. An optimum combination of electronics system protection and a housing design having a reduced installation space requirement compared to the prior art is made possible by means of the encapsulation 5.3. Moreover, a separate housing is not required on account of the encapsulation 5.3.

The encapsulation 5.3 is preferably formed from a curable material, for example a thermoset, such that the form fit and the material bond between the encapsulation and the electronic circuit arrangement 5.2 can be produced particularly easily. The curable material can in this case be applied by means of compression molding, transfer molding or alternatively by means of injection molding.

The interference suppression module 5 furthermore comprises at least one interface 5.4, which is provided for the purpose of electrical contact-connection of the electronic circuit arrangement 5.2 to the power electronics system of the control unit 4.

The interface 5.4 can be formed in various ways, which are dealt with in more detail in the following FIGS. 3 to 6.

FIGS. 3 to 6 here show various exemplary configurations of the interference suppression module 5, wherein the interference suppression module 5 is shown in each case in a sectional illustration, in particular in a longitudinal section.

Figure 3:
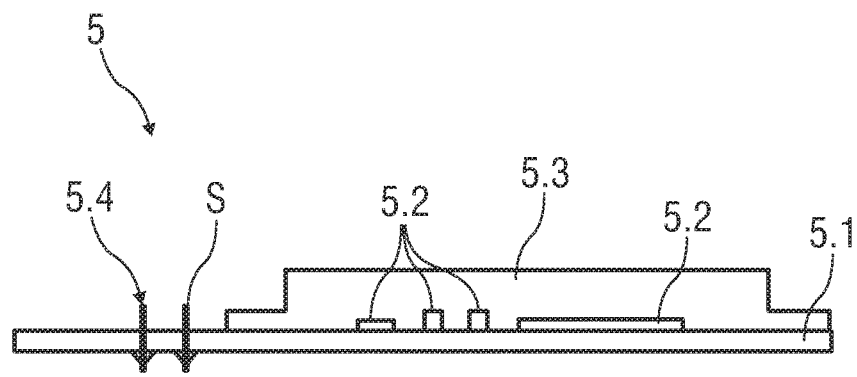

In FIG. 3, the interface 5.4 is designed as a lead frame S, wherein two electrical conductors running parallel to one another are guided through the circuit carrier 5.1 and project upward from a populated flat side of the circuit carrier 5.1. The lead frame S is electrically conductively connected to the electronic circuit arrangement 5.2, for example by means of lead frame sections running in the circuit carrier 5.1.

In this case, the populated flat side of the circuit carrier 5.1 is, for example, a side facing the control unit 4. An unpopulated flat side of the circuit carrier 5.1 faces away from the control unit 4, wherein sections of the conductors projecting beyond the unpopulated flat side of the circuit carrier 5.1 are sealed using an electrically insulating material. Alternatively, the circuit carrier 5.1 can also be oriented differently relative to the control unit 4.

As an alternative to this, a cable or a press-in contact can be arranged or incorporated as the interface 5.4 in a similar manner, wherein said interfaces are electrically conductively connected to the electronic circuit arrangement 5.2 in each case, for example, by means of a conductor track integrated in the circuit carrier 5.1.

Figure 4:
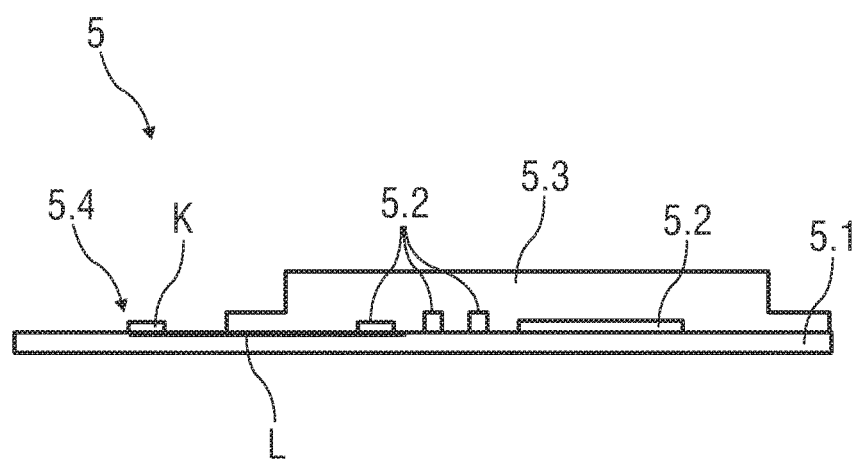

In FIG. 4, the interface 5.4 comprises an exposed contact surface K on the populated flat side or alternatively on an opposite flat side of the circuit carrier 5.1, which exposed contact surface is connected to a line element L integrated into the circuit carrier 5.1. The line element L can in this case likewise be a conductor track and is electrically connected to the electronic circuit arrangement 5.2.

The electrical contact surface K is in this case either designed in the form of a surface-mounted component and soldered directly onto the circuit carrier 5.1 or designed as an open conductor surface of the circuit carrier 5.1, for example as a small galvanized plate or as a copper surface. The contact surface K is expediently formed from an electrically conductive material, for example from metal or an electrically conductive ceramic.

In this case, the unpopulated flat side of the circuit carrier 5.1 preferably has no open electrical contact points.

Figure 5:
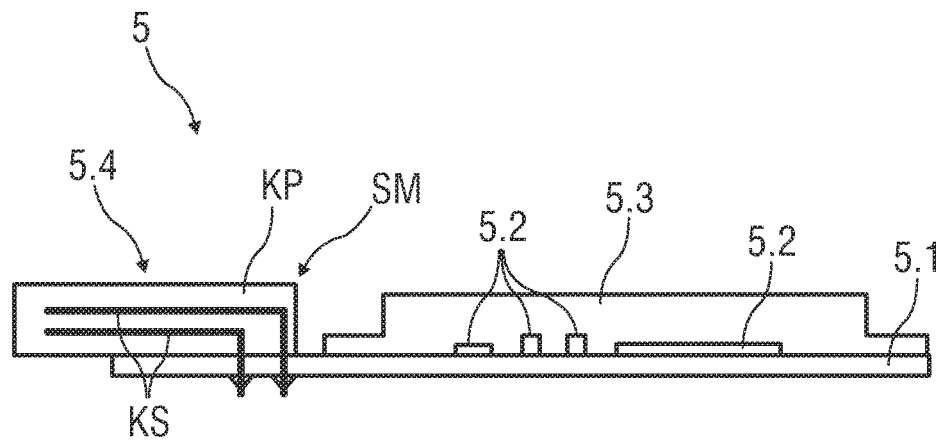
Figure 6:
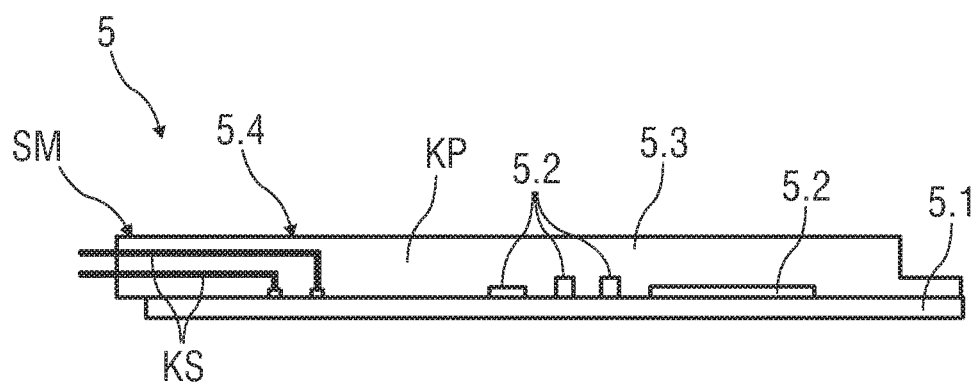

In FIGS. 5 and 6, the interface 5.4 is in each case designed as an integrated plug module SM, which has two contact pins KS running parallel to one another, which are each angled away at a right angle above or, depending on an installation space, below the populated flat side of the circuit carrier 5.1.

In FIG. 5, the contact pins KS are surrounded by a further encapsulation KP, which is formed separately to the encapsulation 5.3 of the electronic circuit arrangement 5.2.

In FIG. 6, the encapsulation 5.3 and the further encapsulation KP are formed in one piece, such that they can be applied in the same method step during the production of the interference suppression module 5.

The interference suppression module 5 can be connected to the control unit 4 particularly easily by means of the plug module SM as the interface 5.4. The control unit 4 has a plug socket corresponding to the plug module SM for this purpose.

The electrical contact pins KS can in this case be arranged from both sides, for example by means of being pushed through and then by means of soldering, welding or adhesive bonding on both sides. Alternatively, the electrical contact pins KS can also be soldered, welded or adhesively bonded on one side.

| List of reference signs | |
|---|---|
| 1 | Vehicle |
| 2 | Electric motor |
| 3 | Transmission |
| 4 | Control unit |
| 5 | Interference suppression module |
| 5.1 | Circuit carrier |
| 5.2 | Electronic circuit arrangement |
| 5.3 | Encapsulation |
| 5.4 | Interface |
| GM | Geared motor |
| K | Contact surface |
| KS | Contact pin |
| KP | Further encapsulation |
| L | Line element |
| S | Lead frame |
| SM | Plug module |

The invention claimed is:

1. An interference suppression module, in combination with an electrically commutated electric motor of a transmission of a vehicle and a control unit of the electrically commutated electric motor, the interference suppression module comprising:
   a circuit carrier;
   an electronic circuit arrangement disposed on said circuit carrier;
   an encapsulation encasing said electronic circuit arrangement with a form-fit and in a material bond; and
   at least one interface electrically connecting said electronic circuit arrangement to the control unit of the electrically commutated electric motor of the transmission of the vehicle, said at least one interface being a plug module including at least one electrical contact pin and a further encapsulation encasing said at least one electrical contact pin with a form-fit and with a material bond, wherein said further encapsulation is separate from said encapsulation, and wherein the control unit is separate from said interference suppression module and is electrically connected to said circuit carrier by said at least one electrical contact pin of said at least one interface.

2. The interference suppression module according to claim 1, wherein said at least one interface is a lead frame.

3. The interference suppression module according to claim 1, wherein said at least one interface comprises an exposed contact surface that is electrically connected to said electronic circuit arrangement by way of an electrical line element integrated into said circuit carrier.

4. The interference suppression module according to claim 1, wherein said electronic circuit arrangement is connected to said circuit carrier in a material bond.

5. The interference suppression module according to claim 4, wherein said electronic circuit arrangement has at least one capacitor.

6. The interference suppression module according to claim 5, wherein said at least one capacitor is an electrolytic capacitor.

7. The interference suppression module according to claim 1, wherein said encapsulation does not cover said further encapsulation.

8. The interference suppression module according to claim 1, wherein a space separates the encapsulation and the further encapsulation.

9. A method for producing and connecting an interference suppression module for an electrically commutated electric motor, the method comprising:
   placing and securing an electronic circuit arrangement on a flat side of a circuit carrier;

integrating at least one interface for electrical contact-connection of the electronic circuit arrangement to a control unit of the electric motor directly into the circuit carrier;

providing a curable encapsulation material at least on the electronic circuit arrangement and curing the encapsulation material which, upon curing, is connected to the electronic circuit arrangement in a form-fitting and material-bonding connection and encapsulates the electronic circuit arrangement in one piece, wherein the at least one interface is a plug module that includes at least one electrical contact pin and a further encapsulation encasing the at least one electrical contact pin with a form-fit and with a material bond, and wherein the further encapsulation is separate from the encapsulation, and wherein the electronic circuit arrangement and the at least one interface form parts of the interference suppression module, and wherein the control unit is separate from the interference suppression module; and electrically connecting the control unit, which is separate from the interference suppression module, to the circuit carrier by the at least one electrical contact pin of the at least one interface.

10. The method according to claim 9, wherein the encapsulation does not cover the further encapsulation.

11. The method according to claim 9, wherein a space separates the encapsulation and the further encapsulation.

* * * * *